(12) United States Patent
Ko

(10) Patent No.: US 6,522,419 B1
(45) Date of Patent: Feb. 18, 2003

(54) MULTIMEDIA PRESENTATION COMPUTING DEVICE

(76) Inventor: Yoonyong Ko, 779-5, Hwajung-dong, Seo-gu, Kwangju (KR)

(*) Notice: Subject to any disclaimer, the term of this patent is extended or adjusted under 35 U.S.C. 154(b) by 0 days.

(21) Appl. No.: 09/117,563
(22) PCT Filed: Nov. 27, 1997
(86) PCT No.: PCT/KR97/00245
§ 371 (c)(1),
(2), (4) Date: Nov. 9, 1998
(87) PCT Pub. No.: WO98/26398
PCT Pub. Date: Jun. 18, 1998

(30) Foreign Application Priority Data

Nov. 29, 1996 (KR) .............................. 96-59515
Nov. 29, 1996 (KR) .............................. 96-59517

(51) Int. Cl.[7] .............................................. G06F 15/00
(52) U.S. Cl. ...................................... 358/1.15; 358/1.1
(58) Field of Search ........................ 358/1.1, 1.9, 1.12, 358/1.13, 1.14, 1.15, 400; 382/251, 252, 232, 234, 236; 341/110, 123, 124, 126, 200; 345/302, 348, 349, 358

(56) References Cited

U.S. PATENT DOCUMENTS

| | | | |
|---|---|---|---|
| 5,553,364 A | * 9/1996 | Sitrick | 463/31 |
| 5,666,267 A | * 9/1997 | Carter et al. | 361/686 |
| 5,761,525 A | * 6/1998 | Williams | 345/302 |
| 5,765,201 A | * 6/1998 | Manges et al. | 711/201 |
| 5,790,173 A | * 8/1998 | Strauss et al. | 725/114 |
| 5,818,435 A | * 10/1998 | Kozuka et al. | 345/302 |
| 5,830,065 A | * 11/1998 | Sitrick | 463/31 |
| 5,986,655 A | * 11/1999 | Chiu et al. | 345/349 |
| 5,995,155 A | * 11/1999 | Schindler et al. | 348/361 |
| 6,091,857 A | * 7/2000 | Shaw et al. | 382/251 |

* cited by examiner

Primary Examiner—Gabriel Garcia
(74) Attorney, Agent, or Firm—McKenna Long & Aldridge LLP (57) ABSTRACT

The proposed multimedia presentation computing device is beneficial as it is low in cost and is extremely user friendly. The device is easy to set up and control, is easily connected to various input and output devices, easily stores and manipulates data and effectively presents the resulting material. To create this multimedia presenting computer device we require an input unit which will receive various information, an output unit which will transfer the information to various devices, a central processing unit (CPU) which will accept the inputted information, manipulate it, store it and transfer it to the output devices, a storage device which will store the manipulated information and send it to the CPU, a controller which will manage the CPU, and other parts and devices that will contain and make the above mentioned devices work more efficiently.

1 Claim, 10 Drawing Sheets

when a CD or DVD exists    when there is no CD or DVD

Fig. 17 (B)

MULTIMEDIA PRESENTATION COMPUTING DEVICE

TECHNICAL FIELD

This is a Multimedia Presentation Computing Device for visual and audio teaching, presentations, broadcasting, briefing, editing, playing music, video art and entertainment.

Presently the projectors being utilized are the OHP (overhead projector) and the slide projector, both of which are restricted to presenting silent, still pictures.

Due to the fact that the upkeep of these projectors and the creation of slide materials is expensive and difficult, the OHPs and slide projectors are not widely used.

On the other hand, VCRs provide us with moving pictures and audio and is easily used, but the creation, management and storage of the materials is time consuming and difficult. Furthermore the user has no control over the presentation while it is in progress.

As for the PC, it is capable of multimedia presentations but the necessity of having to connect many additional multimedia devices requires a greater level of knowledge and skill in order to connect, load and manage the devices and programs.

It is also not easy to present with the PC as it requires a great deal of preparation time and there is a high occurance of error. Another drawback is that the speaker must concentrate upon the computer instead of the audience. For these reasons people avoid the use of the PC in a presentation setting.

The reason that the PC does not provide a good multimedia presentation environment is because of the complexity of the board and cards, and the arrangement of the interface of the input and output.

The PC is very complex in that there are many upgrade ports and many cards such as a sound card, VGA card, MPEG card made in many different companies inserted at right angles causing a waste of parts, enlargement of the product size, increase of incompatibility and troubles, increase of the product cost, complexity of the interfaces and cords at the back side of the PC, inconvenience of use, and deteriorating the multimedia presentation environment.

And also the text keyboard and the mouse made for desk top use tie the speaker to the computer.

Therefore the exclusive use of the multimedia presentation computing device is required.

DISCLOSURE OF INVENTION

The intended multimedia presentation computing device overcomes the present limitations. This piece of reformed equipment, enables the user to edit, create and present easily by arranging the main input interfaces at the front side of the device; eliminates the problem of incompatibility, is decreased in size, and has lowered the product cost by unifying the board and the cards; has shortened the booting time and prevented breakdown due to viruses by installing the OS and main program onto a chip; is easily managed while presenting by the exclusive use of the controller, even apart from the device.

The proposed multimedia presentation computing device will achieve all of the above purposes by incorporating all of the merits of the above explained multimedia devices into one simple, manageable multimedia presentation device.

For the input, the following will be incorporated: disk drivers ie. CD Rom, DVD drive, ZIP disk drive, JAZZ disk drive, and hard drive; microphone for audio input; camera for visual input; text keyboard for text input; music keyboard for audio input; digitizer for visual input; VCR for visual input and visual storage; TV and radio tuner for audio and video input; and a modem for transmitting and communication. All of the above listed devices with their related parts can be connected for the purpose of unlimited information input.

The above mentioned inputted information will be controlled by the IECPU (integrated environmental central processing unit) and be outputted to the output ports or be stored to the storage devices.

To improve the device a unified main board must be created from which useless ports and parts have been removed and commonly used cards such as the sound card, VGA card, MPEG card and encoder are unified onto the main board. It must be controlled to ensure compatibility, and there will also be a spare card port.

In the case of the above mentioned spare card port it is to be fixed to the machine case and be connected, rather than be inserted at a right angle, in order to reduce the size of the machine.

The software for this device will be unique to the machine and will be developed for presentation use only. It will be loaded onto a microchip and then installed onto the board. This installation will prevent viruses and enhance the speed of the programs.

The aforementioned IECPU is controlled by a controller or 'buttons' on the device.

For the output, the following will be incorporated: television monitor; computer monitor; LCD (liquid crystal display); beam projector; speakers and other presentation devices; storage devices and transmitting devices which are connected or installed.

The reason for including the TV monitor is that compared to a PC monitor, the TV monitor is less expensive thereby enabling the presenter to obtain a larger screen.

The proposed unified computer board has input ports for text keyboard, music keyboard, video, speakers, microphone, mouse, controller and headphones installed on the front of the machine.

Input ports and output ports which are not normally disconnected once installed will be located on the rear of the machine to increase user efficiency.

To present animation or movies, a high speed CD Rom drive or DVD drive is required.

In the above description the IECPU receives information from the input devices, processes it and then transmits it to the output devices.

The controller controls the IECPU. The controller is either attached to the device by means of a wire or is wireless.

The user controls the IECPU with the controller, and the IECPU controls the put and output. This IECPU board is not readily available but by incorporating the available devices, parts and software it is possible to create the proposed device.

The result of the processed information can be outputted by either the analogue signal or the digital signal. To achieve this an encoder function must be added to the mainboard which will convert the signals enabling the user to present the information on a TV monitor, edit or create video movies.

To adapt the device to specific purposes sensors such as heat sensors, light sensors, pressure sensors, or moisture sensors, or other input methods like cameras can be added at the input panel. These additions enable the device to be utilized in the technological and security fields.

For use in the field of education a specialized keyboard can be created. This keyboard combines a text keyboard for text input and a digitizer for graphic input.

Examples of this concept in use are a multimedia editing and presentation computer which is compatible with a VCR, a multimedia presentation computer for classroom use, a simplified multimedia presentation computer, a notebook type multimedia presentation computer, a multimedia presentation computer with a fixed monitor or beam projector, and a security system, and its boards.

The following are examples of the proposed device with accompanying illustrations.

Figure 1:
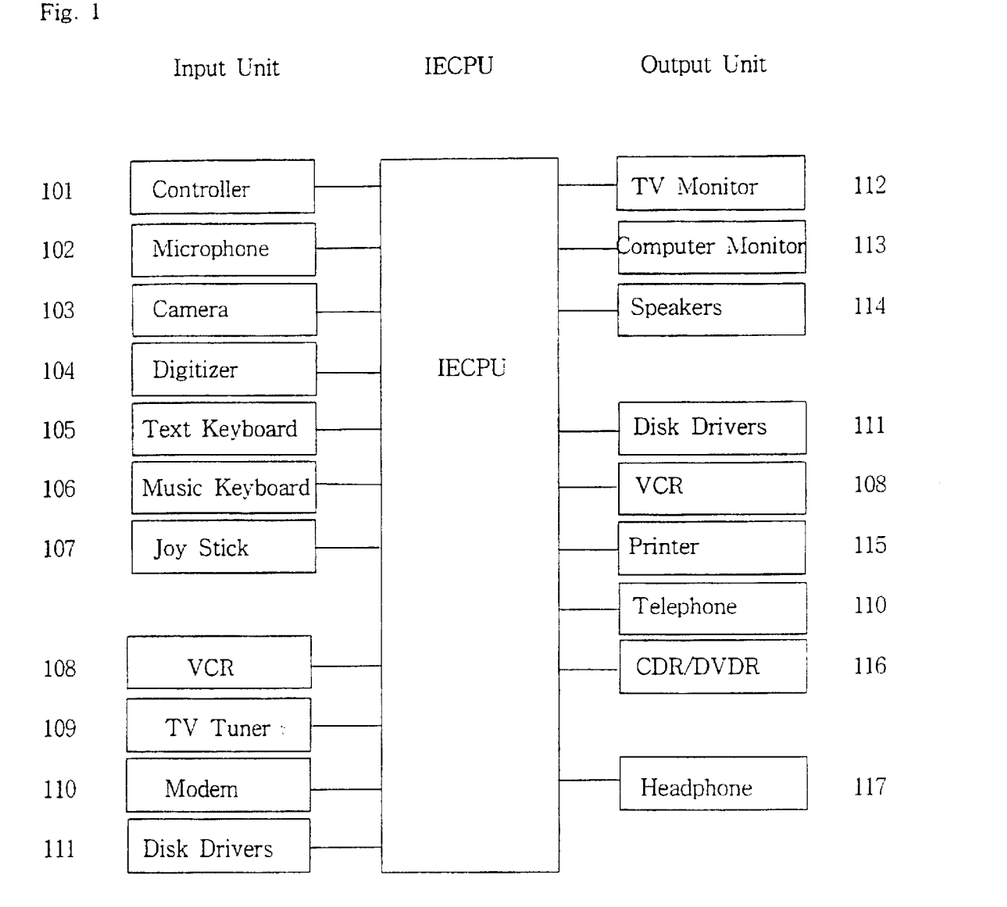
FIG. 1 is Structural Overview

FIG. 1 is a basic structural overview of this device. It is shown that this device is composed of 3 parts—input, processing and output.

For input purposes there are disk drives—CD Rom, DVD drive, ZIP drive, hard disk drive (111); frontal connecting input ports for microphone (102), camera (103), text keyboard (105), music keyboard (106), digitizer (104), joystick (107), etc.; installed input devices ie. TV and radio tuner (109), VCR (108) and modem (110). This example illustrates various input devices being connected, but depending on the desired purpose input devices can be added or removed, or increased or decreased in number in order to create an independent device. For output purposes there are the rear connecting ports which will connect a television or beam projector (112), a computer monitor, LCD or beam projector (113), and a speaker (114); installed or connected storage devices, ie. various disk drives (111), VCR (108); connecting output devices, ie. printer (115), CDR (116), and a telephone modem (110) for transmitting; frontal output port for headphones (117).

FIG. 1 demonstrates all possible input methods but according to the specific purpose of the machine the inputs can be added, removed or reorganized.

FIG. 2a is an angled frontal view of the basic device's input ports. As seen in FIG. 2a there are ports for the controller (4), joystick (5), keyboard (6), music keyboard (7), digitizer (8), microphone (12), visual input (15) and audio input(16).

Also illustrated are the sensor (10), power button (11), volume dial (9) and VCR function buttons (16).

VCR (1), CD driver or DVD driver (2), ZIP disk drive, JAZZ disk drive, removable hard disk driver (3) are storage devices for input and output.

FIG. 2b is an angled rear view of the basic device's output ports. As seen in FIG. 2b there are input ports for the antenna (25 & 26), audio (17), video (18); and output ports for audio (19), video (20), VGA (21), printer (23), telephone (22) and power cord (24).

FIGS. 3a and 3b are similar to illustrations 2a and 2b, and are another example of the device. FIGS. 3a and 3b are a simplified and reorganized version of FIGS. 2a and 2b for classroom use. The VCR has been removed from FIGS. 2a and 2b. The numbered details correspond to that of illustrations 2a and 2b, so the explanations will be omitted.

Figure 4:
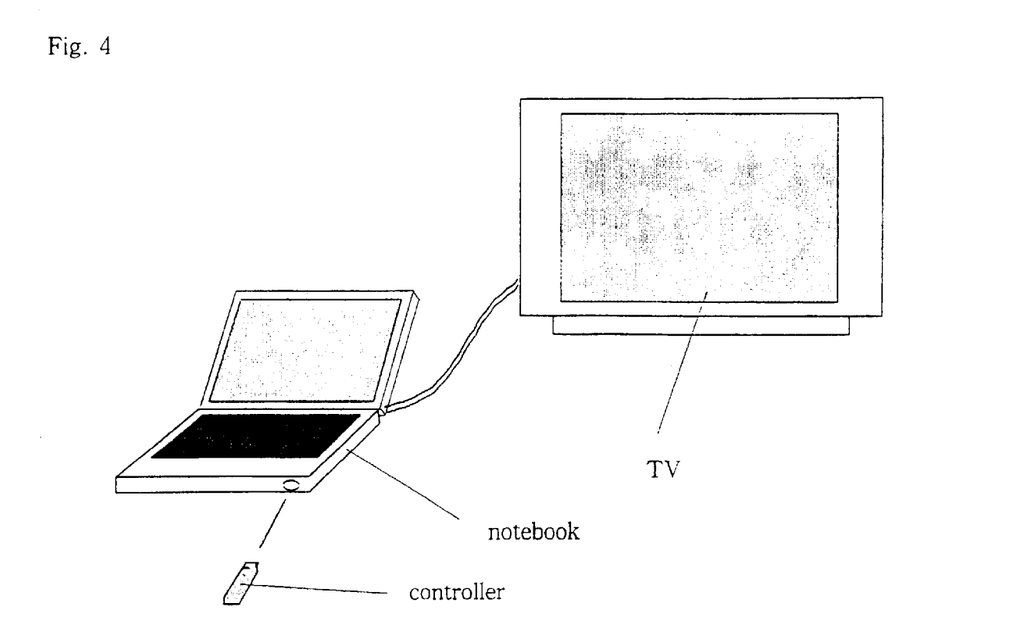
FIG. 4 is Conceptual Draft Illustrating the Connection Between a Multimedia Presentation Notebook Computer and a Television

FIG. 4 is one example of a specifically designed machine. It demonstrates the adaptation of this concept to portable notebooks.

In this example an encoder is added to the notebook's main board enabling the TV monitor to be connected. To use the controller there is a port and sensor on the front panel of the notebook.

By constructing the notebook in this way the notebook, can act as a multimedia presentation computing device, despite its limitations.

Figure 5:
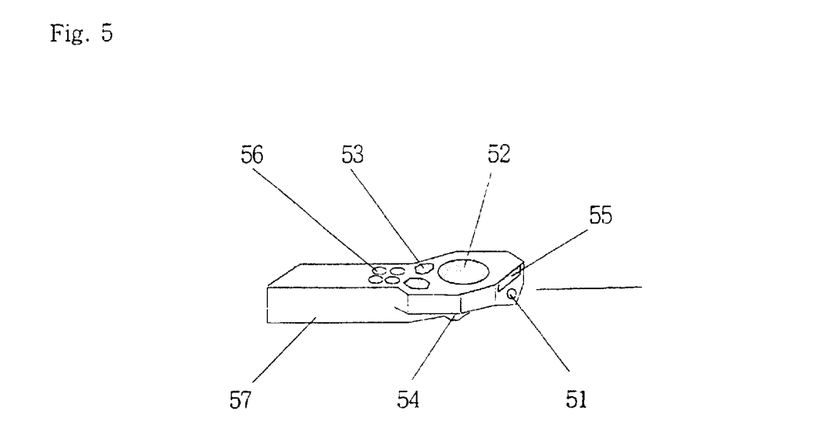
FIG. 5 is Illustration of Controller Which Accompanies Illustrations 2, 3, 4, 6, 7, 8 and 9

FIG. 5 illustrates the multimedia projector controller which accompanies FIGS. 2, 3, 4, 6, 7, 8, and 9. The normal mouse for the PC is restricted to desk use and must be used in conjunction with the screen. The multimedia presentation computing device controller is handheld and is controlled standing beside a large screen, so it must be well designed and have various functions.

FIG. 5 is an example of this multimedia projector controller. There is a light beam pointer (51), trackball, button, or stick which controls the cursor on the screen (52), select buttons—left and right (53), light pointer button (54), remote sensor (55), select buttons (56), and body (57).

This controller has a connecting jack, cord and body, or the jack and cord can be replaced with a sensor.

The body has a cursor movement device, select buttons, and inside the body there is a circuit panel. A light pointer can be added, as can a screen sensor.

The above described controller is strictly an example, as according to it's purpose—education, security, advertising—the controller can be altered in shape and function.

The controller described above can be held in hand, standing a distance from the screen will control the multimedia projector and make explanations easy with the help of the light pointer. Whereas to use a mouse a flat surface and a mouse pad is required, thereby tying the demonstrator to the machine.

FIGS. 6, 7, 8, 9 and 10 are other examples of purpose specific multimedia presentation computer.

Figure 6:
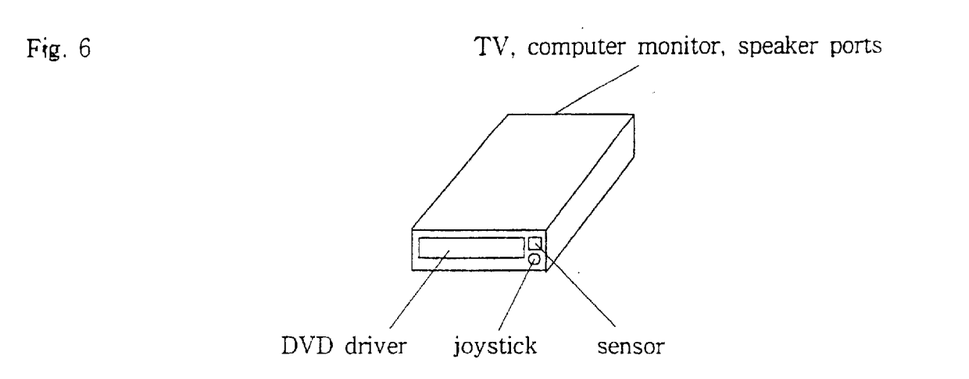
FIG. 6, 7 Sample draft of device—simplified

FIG. 6 is a portable multimedia presentation computer for travelling lectures, sales or just enjoying video music.

Figure 7:
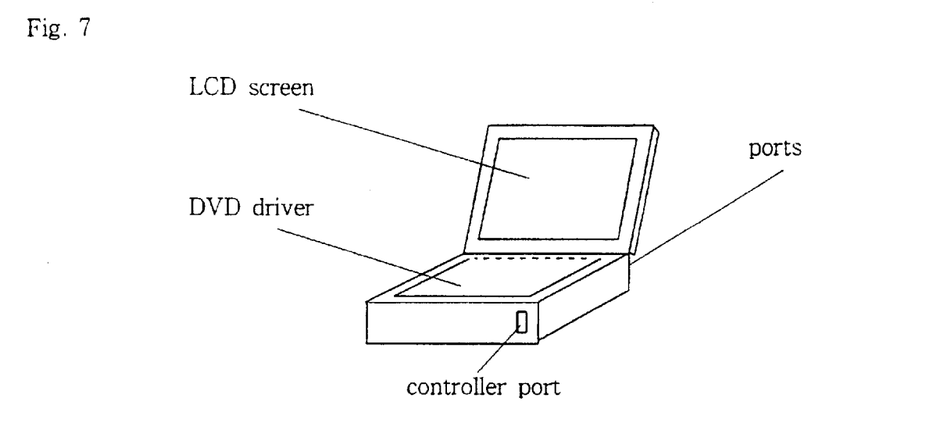

FIG .7 is a portable multimedia presentation computer with a screen for travelling and sales. A TV tuner can also be included in this machine.

Figure 8:
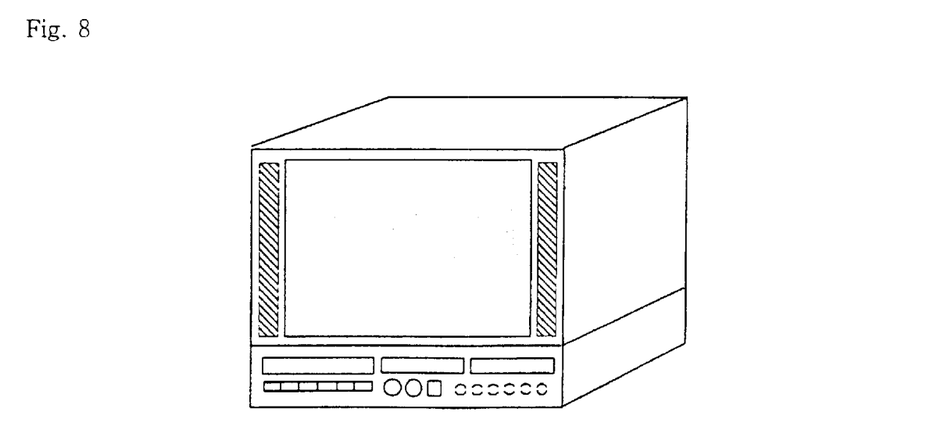
FIG. 8, 9 Sample draft of device—unified with other devices

FIG. 8 is a multimedia presentation computer with a fixed monitor for classrooms. The device can be fixed in the classroom permanently.

Figure 9:
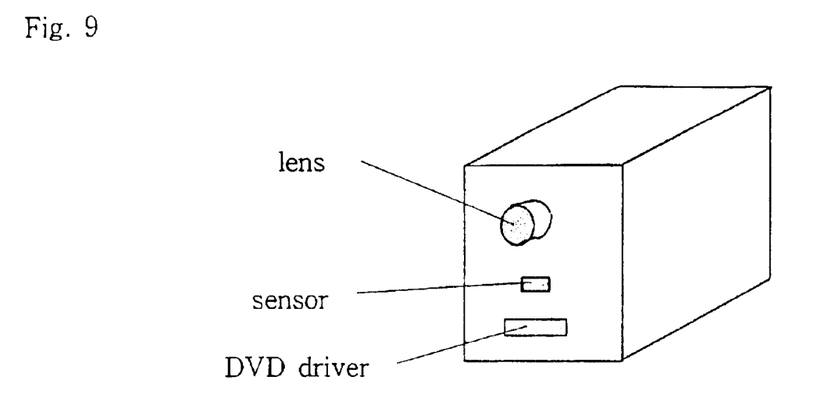

FIG. 9 is a multimedia presentation computer combined with a portable beam projector for small auditoriums.

Figure 10:
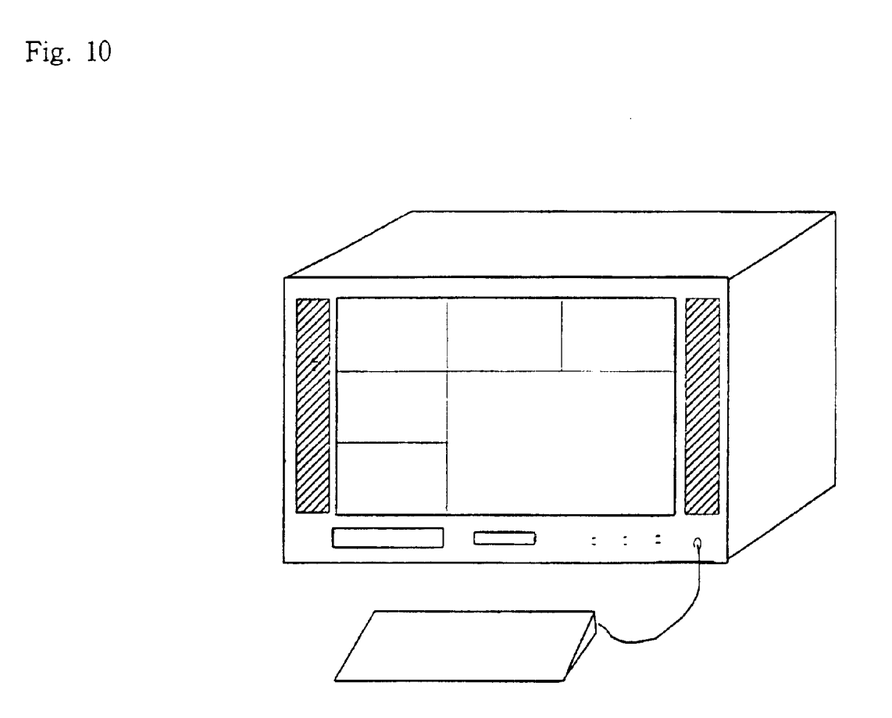
FIG. 10 Sample draft of device—adapted to a different use

FIG. 10 is a multimedia presentation computer with multiple monitors or a split screen for security use, in which video taping, still picture capturing, and arming are possible.

Figure 11:
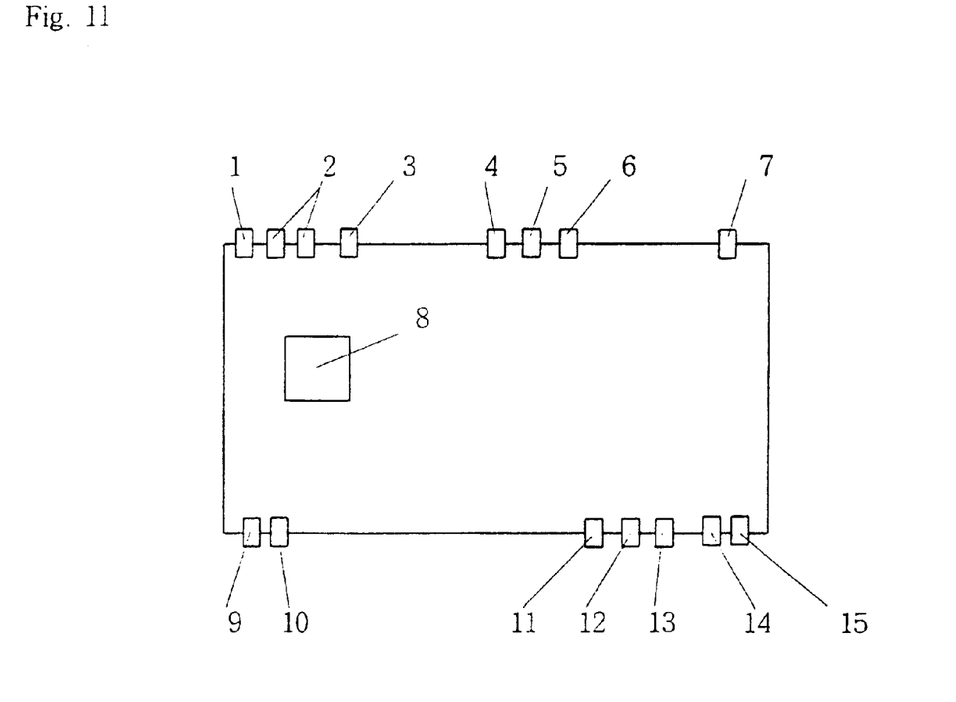
FIG. 11 Arrangement plan of a multimedia presentation computer board

FIG. 11 is an arrangement plan of a multimedia projector board which illustrates input and output ports and a softchip in the middle of the control unit. Illustrated are the visual output ports (1, 3), sound output ports (2), VGA output port (4), telephone port (5), printer port (6), power switch (7), software chip (8), video input port (9), sound input port (10), digitizer port (11), text keyboard port (12), music keyboard port (13), joystick port (14), and controller port (15).

The software chip (8) mentioned above is different from a common personal computer which has many programs on the hard disk, in that it is reduced to a few simple programs which are installed onto the chip and it is powerful graphically and also in sound presentation.

Figure 12:
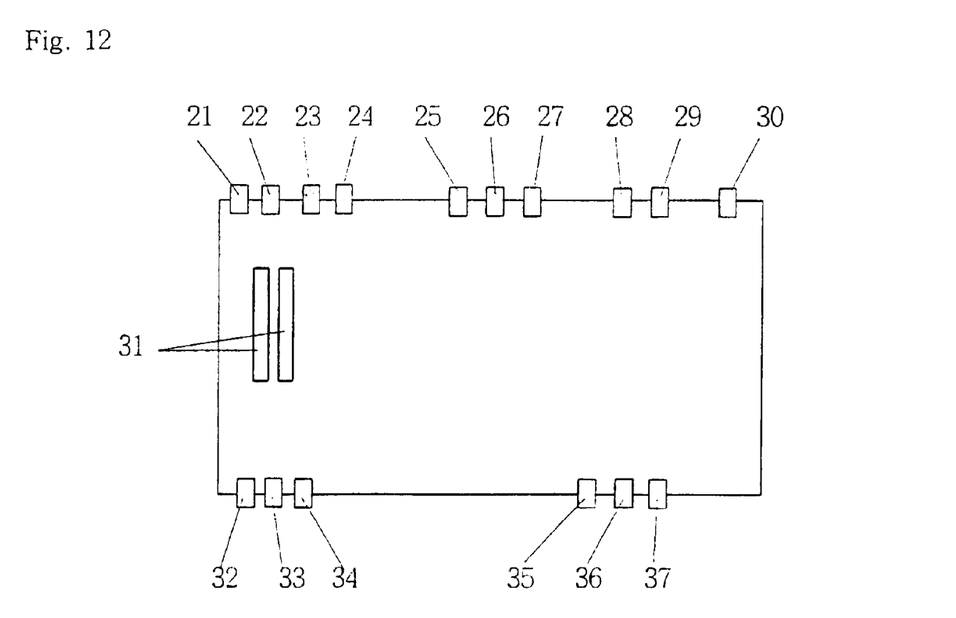
FIG. 12 Arrangement plan of a personal computer board

FIG. 12 is an arrangement plan of a normal personal computer board on which the cards have been unified onto one board and the input ports have been located on the front of the machine.

Illustrated are the sound input and output ports (21 & 22), video input and output ports (23 &, 24), VGA output port (25), telephone port (26), printer port (27), text keyboard port (28), mouse port (29), power switch (30), additional card ports (31), sound and video input port (32), microphone port (33), headphone port (34), digitizer port (35), music keyboard port (36), and joystick port (37).

Figure 13:
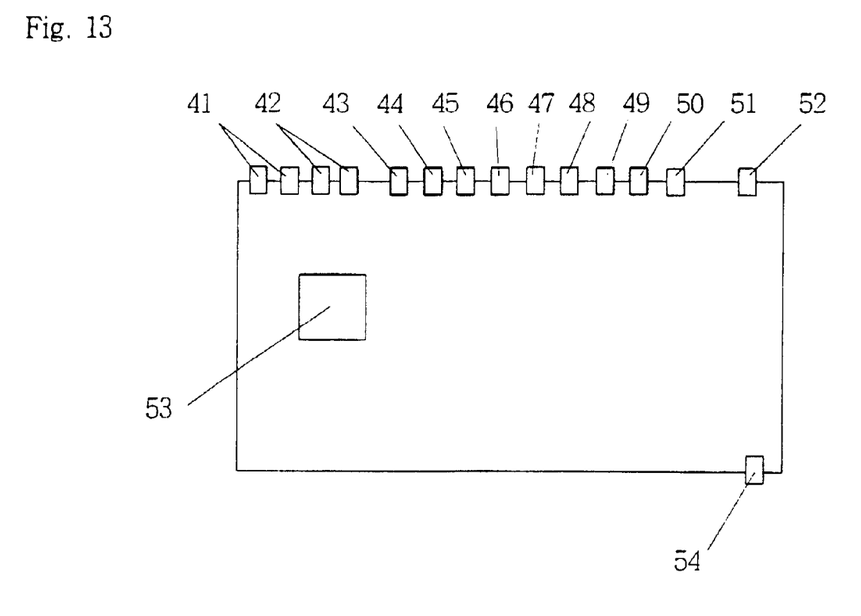
FIG. 13 Arrangement plan of a security system computer board

FIG. 13 is an arrangement plan of a security system. It integrates a video output port (41), sound output port (42), varying numbers of video and sound input ports (43–51), software chip (53), power switch (52), and control keyboard port (54).

In this illustration, the board has 1 video output port and 9 video input ports, but the number is not limited and is changable.

Figure 14:
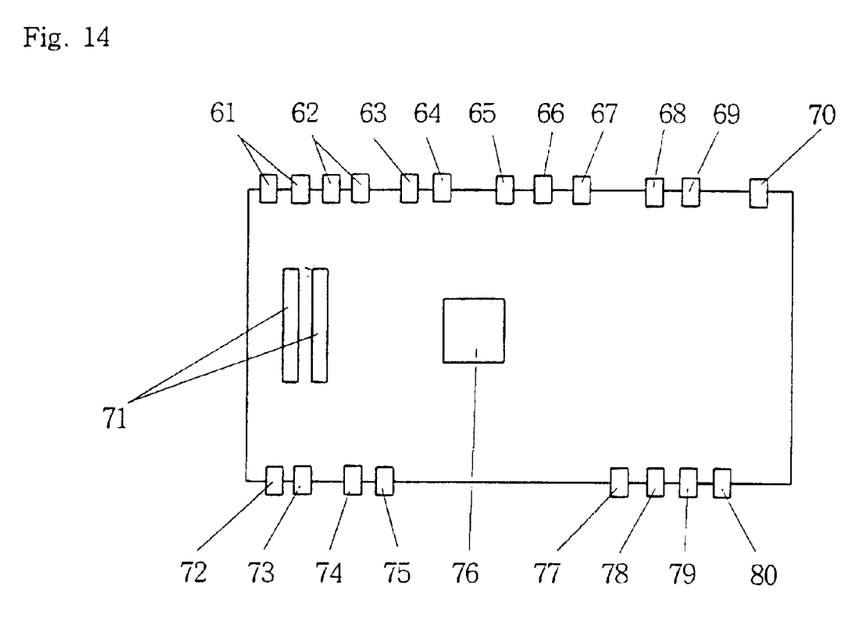
FIG. 14 Arrangement plan of a multimedia editing and presentation computer board FIG. 15 Arrangement plan of a simple multimedia presentation computer board FIG. 16 Illustration of multimedia presentation keyboard FIG. 17 Flowchart of a softchip

FIG. 14 is an arrangement plan of a multimedia editing and presentation computer board. Illustrated are the video input and output ports (61), sound input and output ports (62), video and sound, input and output port (63), scanner port (64), VGA output port (65), telephone port (66), printer port (67), text keyboard port (68), mouse port (69), power switch (70), additional card port (71), softchip (76), video and sound input ports (72 & 73), microphone port (74), headphone port (75), digitizer port (77), music keyboard port (78), joystick port (79), and controller port (80).

As is seen in this illustration, the board has a scanner input port, and is connected with the VCR which is located inside the computer and is compatible with the computer. This enables the user to exchange, edit and store the information in different ways and also enables the computing system and VCR to present information both separately and together.

Figure 15:
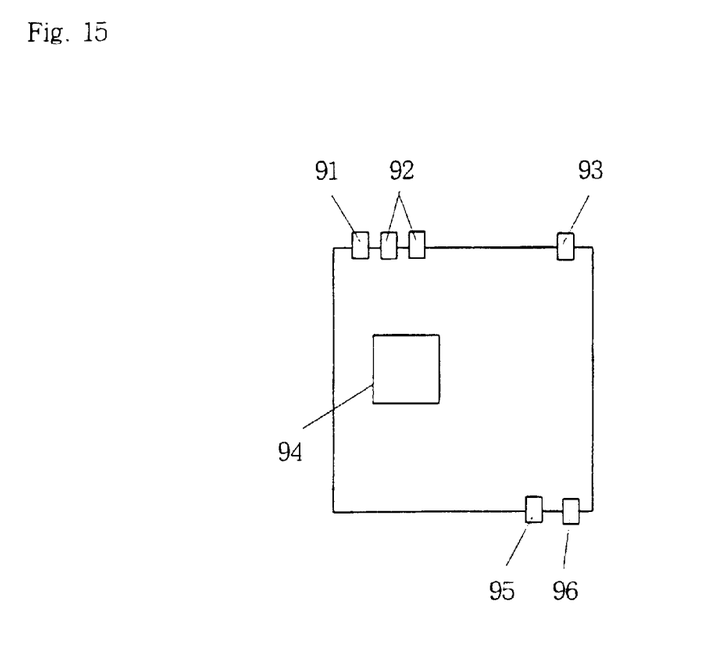

FIG. 15 is a simplified multimedia presentation computer board. Illustrated are the video output port (91), sound output port (92), power switch (93), software chip (94), joystick port (95), and controller port (96). This illustration is a simple presentation computer board which provides video and sound output. It is specifically designed for schools, and sales and advertising firms.

Figure 16:
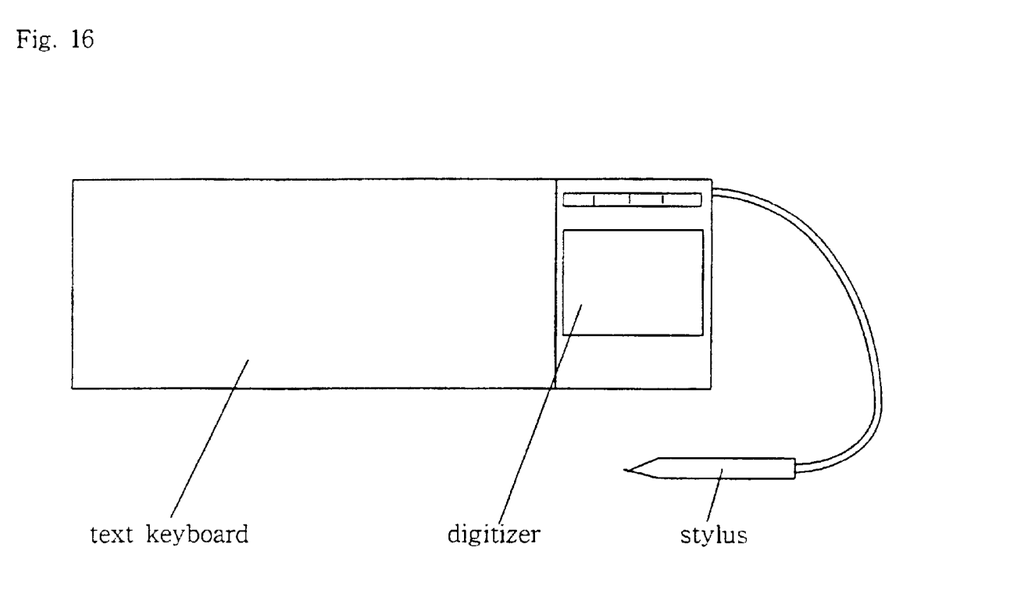

FIG. 16 is a multimedia presentation keyboard with some function keys combined with a text keyboard and a digitizer for teacher's use.

FIG. 17b is a flowchart of a softchip. When the user turns on the power the system will determine if a CD is present in the system and will choose the suitable environment and display it on the screen. If a CD is present the system proceeds directly to the first screen of the CD (FIG. 17a) on which 3 icons will be present. The first icon is connected to a computing blackboard on which the user can write and draw. The second icon will lead to the Windows program for example. The last icon will exit the CD. If the user desires to process the CD program it is only necessary to access the CD. If no CD is present, the icons of Windows, internet, TV, telephone, and other programs registered will appear on the screen. The user can then select one and enter it. This selection process will make presentations quick and easy to set up and the various softchips can be installed with various purpose specific programs.

Other boards such as specific education computing boards, home computing boards, or advertisement computing boards can be created according to their purpose.

Figure 2:
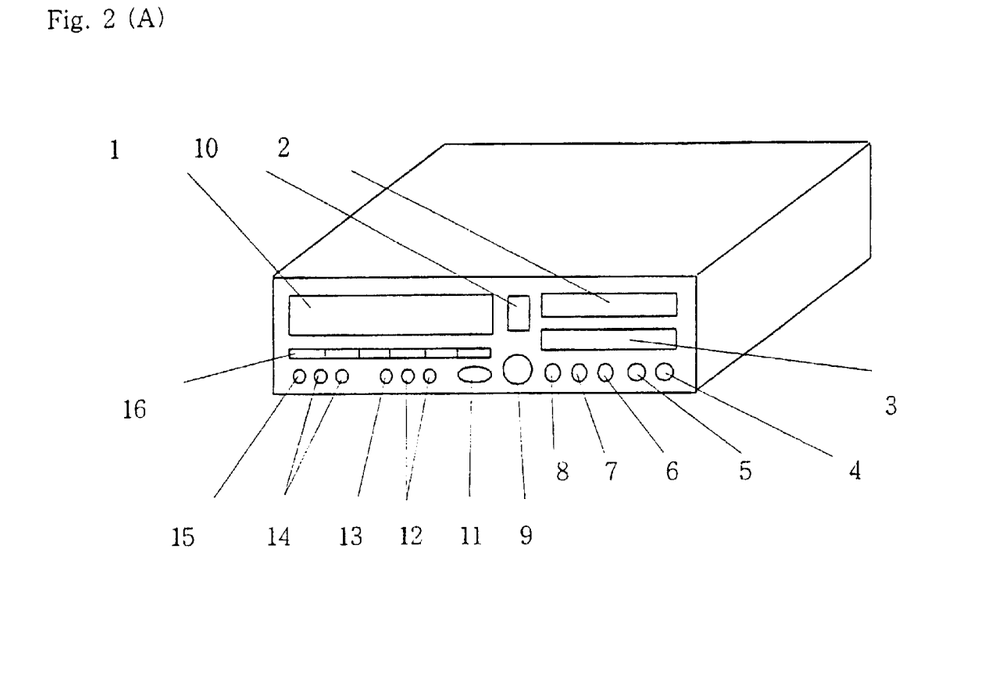
Figure 3:
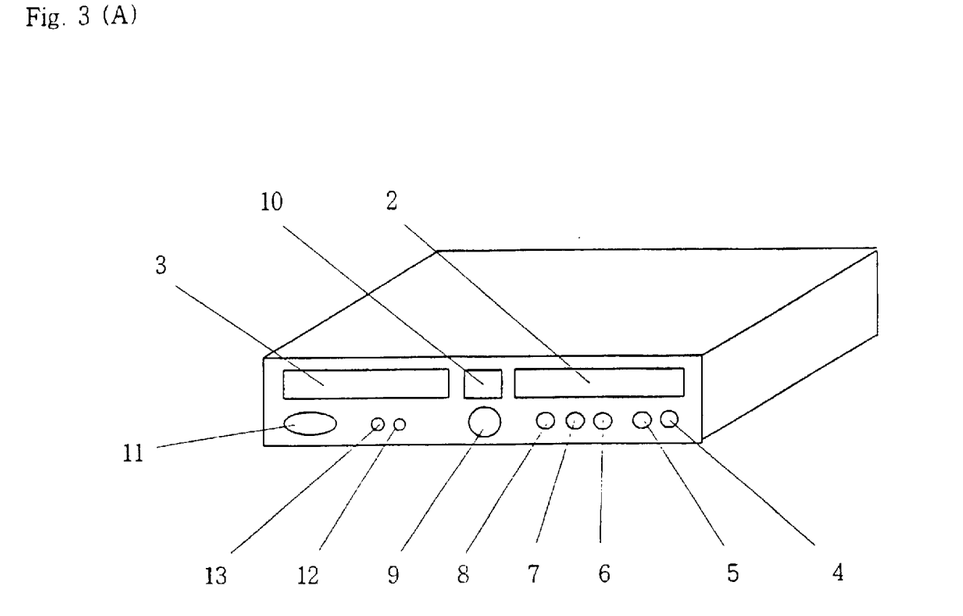
FIG. 3a) is front view of Device Basic
FIG. 3b) is rear view of Device—Basic
Figure 17:
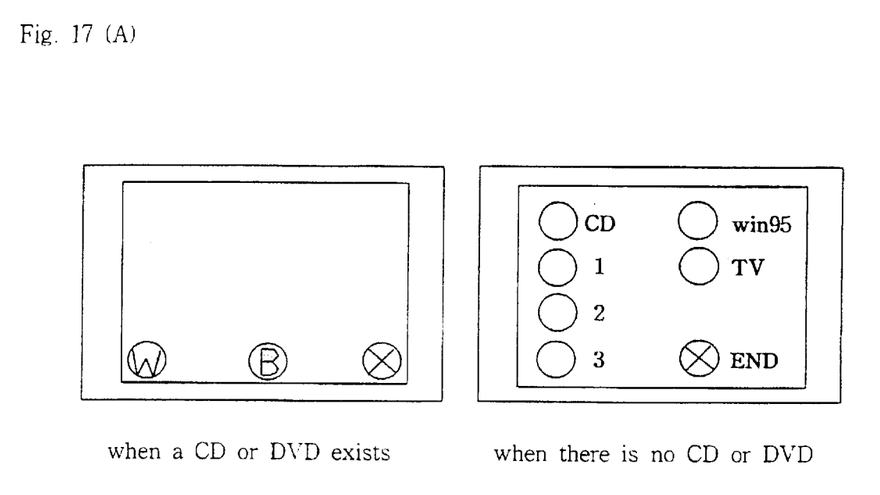

The basic concept of the device is illustrated in FIG. 1. FIGS. 2 and 3 are the examples of this device's structure. FIG. 4 is the adaptation to notebook use. FIG. 5 is an example of the controller which will accompany FIGS. 2, 3, 4, 6, 7, 8 and 9. FIG. 11, 12, 13, 14 and 15 are the examples of multimedia present computing board. FIG. 16 is an example of the multimedia presentation keyboard. FIG. 17 is an example of a softchip for the multimedia presentation computer.

All the above descriptions are only examples and the rights surrounding this invention are not limited to the above descriptions and examples. This device can be modified if it does not stray from the original idea, and all resulting ideas will be covered under the original right.

The multimedia presentation computer can provide the following benefits.

Comparison to Normal Visual and Audio Teaching Devices

1) Easily managed due to small size and light weight.
2) There are no changeable parts that need to be replaced.
3) Easily controlled due to remote controller.
4) Creation, management and use of the material is easy because everything is located in the same hard drive.
5) Storage and management of the material is low in cost.
6) Creation, editing and storage of materials requires no space.
7) Other devices are not required to create material.
8) Visual and audio presentations can be presented independently or in conjunction with one another.
9) Can be used to present to many groups at the same time according to the number of rooms and monitors.
10) Can be used to present more than 2 concepts at the same time enabling the presenter to easily compare them.
11) If a telephone line is used, materials can be collected from great distances.
12) If a telephone line is used, presentations can be made to many locations simultaneously.
13) It is possible to videotape the presentation without additional equipment.
14) Can be used as a musical instrument.
15) Can be used as a blackboard, notebook, or canvas.
16) Can be used to run animation or movies with interactive controls.
17) Can use various disks—CD, CD Rom, CDI, etc., and also video tapes.

Compared to the PC

1) Low in cost due to removed parts and cards, and smaller insize.
2) Most of the external devices and cords are removed.
3) Easily set up due to fewer number of cords at the rear side.
4) Small in size and the number of connections are few, so the device is easily moved.
5) Easily controlled using remote control.
6) Input ports are easily accessible.
7) Unified board has no compatibility problems.
8) A well constructed and controlled board requires less user knowledge.
9) The simplified OS microchip ensures that there is no viral danger.
10) A short set up time.
11) Using a TV monitor or a projector provides a big screen presentation with a low cost.
12) The presenter does not require a helper due to the use of the exclusive controller.
13) The above benefits enable the presenter to interact with the audience while running the presentation.

Related Benefits—Classroom Use

1) Can be easily used to present various visual and audio displays.
2) The teacher can easily create presentations according to need, student level and can personalize the presentation to the classroom, which will stimulate student learning.
3) The students can create programs and present them to the class easily which will lead to a more positive study atmosphere, a better social atmosphere, and increased knowledge of the applications of the modern technology.
4) In using this machine and it's communication ability we can eliminate the need for textbooks and workbooks.

Locations of use for this device,

School classrooms, conference rooms, churches, meetings and home use.

BRIEF DESCRIPTION OF DRAWINGS

FIG. 2a) is front view of Device Complex b) is rear view of Device—Complex

What is claimed is:

1. A multimedia presentation computing device, comprising:

a remote controller;

an input unit having interfaces at a front side of the device for connecting the remote controller, a keyboard, and a microphone;

an output unit having interfaces for connecting a monitor and a speaker;

a storage device for storing sound, graphic, and video files;

a processing unit having sound, graphic, and video controllers, the processing unit processing and sending the data of the storage device to the output unit, and selectively processing and sending data from at least one of the camera, the microphone, and the keyboard to the output unit according to a signal of the remote controller or the keyboard;

an operating system enabling the controllers of the processing unit to process data of the storage device and data from the input unit;

wherein the operating system has a from of a chip and is upgraded by replacing the operating system, and wherein the processing unit is in a form of one integrated circuit board where the sound, graphic, and video controllers are unified.

* * * * *

UNITED STATES PATENT AND TRADEMARK OFFICE
CERTIFICATE OF CORRECTION

PATENT NO.    : 6,522,419 B1
DATED         : February 18, 2003
INVENTOR(S)   : Yoonyong Ko It is certified that error appears in the above-identified patent and that said Letters Patent is hereby corrected as shown below:

Title page,
Item [76], Inventors, please insert the following data:
"Yoonyong Ko, 103-1003 Sehan Apt., Poongam-dong, Seo-gu, Gwangju, 502-832, Republic of Korea"
Item [57], ABSTRACT,
Line 10, please replace "inputted" with -- input --

Column 2,
Line 9, please replace "inputted" with -- input --;
Line 11, please replace "outputted" with -- transferred --;

Column 4,
Line 28, please insert -- , -- immediately after "mouse"; and

Column 8,
Line 31, please replace "from" with -- form --.

Signed and Sealed this

Twenty-first Day of October, 2003

JAMES E. ROGAN
*Director of the United States Patent and Trademark Office*